(12) United States Patent
Umansky et al.

(10) Patent No.: US 8,756,594 B2
(45) Date of Patent: Jun. 17, 2014

(54) REACTIVE ANTI-TAMPERING SYSTEM FOR PROTECTED SERVICES IN AN ENTERPRISE COMPUTING SYSTEM

(75) Inventors: Alex Umansky, Akko (IL); Eli Zeitlin, Bellevue, WA (US); Ronen Borshack, Ginaton (IL)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 13/283,635

(22) Filed: Oct. 28, 2011

(65) Prior Publication Data

US 2013/0111462 A1    May 2, 2013

(51) Int. Cl.
  *G06F 9/445* (2006.01)
(52) U.S. Cl.
  USPC .......................... 717/174; 717/173; 717/175
(58) Field of Classification Search
  USPC .......................... 717/124–129, 176, 170–175; 709/203–204
  IPC ..................... G06F 11/30,11/51, 11/55, 11/362, G06F 11/3604, 11/3668
  See application file for complete search history.

(56) References Cited

U.S. PATENT DOCUMENTS

| | | | |
|---|---|---|---|
| 6,606,744 B1 * | 8/2003 | Mikurak | 717/174 |
| 7,092,995 B2 * | 8/2006 | Kaler et al. | 709/206 |
| 7,188,342 B2 * | 3/2007 | DeMello et al. | 717/173 |
| 7,191,436 B1 * | 3/2007 | Durr et al. | 717/170 |
| 7,207,039 B2 * | 4/2007 | Komarla et al. | 717/178 |
| 7,356,707 B2 * | 4/2008 | Foster et al. | 713/189 |
| 7,398,524 B2 * | 7/2008 | Shapiro | 717/175 |
| 7,409,714 B2 * | 8/2008 | Gupta et al. | 726/23 |
| 7,506,338 B2 * | 3/2009 | Alpern et al. | 717/177 |
| 7,660,846 B2 * | 2/2010 | Albornoz et al. | 709/203 |
| 7,810,091 B2 * | 10/2010 | Gartside et al. | 717/177 |
| 7,818,741 B1 * | 10/2010 | Bourdev | 717/174 |
| 7,904,450 B2 * | 3/2011 | Wilson | 707/723 |
| 8,261,256 B1 * | 9/2012 | Adler et al. | 717/173 |
| 8,278,948 B2 * | 10/2012 | Johnson | 324/691 |
| 2005/0066165 A1 | 3/2005 | Peled et al. | |
| 2010/0050176 A1 | 2/2010 | Vanderpool | |

OTHER PUBLICATIONS

Elmore et al, "Characterizing Tenant Behavior for Placement and Crisis Mitigation in Multitenant DBMSs", ACM, pp. 517-528, 2013.*
Cong et al, "Assuring Application-level Correctness Against Soft Errors", IEEE, pp. 150-157, 2011.*
Sousan et al, "Using Anomalous Event Patterns in Control Systems for Tamper Detection", ACM, pp. 1-4, 2011.*
Phung et al, "Lightweight Self-Protecting JavaScript", ACM, pp. 47-60, 2009.*

(Continued)

*Primary Examiner* — Anil Khatri
(74) *Attorney, Agent, or Firm* — Ben Tabor; Kate Drakos; Micky Minhas

(57) ABSTRACT

An enterprise computing system may utilize a management infrastructure that interacts with protected services in the system. The management infrastructure accepts requests through an anti-tamper procedure that specifies a tamper event, a crucial service to be protected, and a remedial action that may be applied when the tamper event occurs on the protected service. The anti-tamper procedure may be created by a system administrator and distributed to one or more client devices in the system. The management infrastructure monitors a protected service in accordance with the operations and actions specified in the anti-tamper procedure thereby ensuring that the integrity of the system is preserved.

19 Claims, 12 Drawing Sheets

(56) References Cited

OTHER PUBLICATIONS

"Services", Retrieved at <<http://documentation.commvault.com/hds/release_8_0_0/books_online_1/english_us/features/services/services.htm>>, Retrieved Date: Jul. 21, 2011, pp. 7.

"Mac OS X Server: About the Watchdog Process", Retrieved at <<http://supportapple.com/kb/TA20622?viewlocale=en_US>>, Oct. 3, 2008, pp. 2.

"Microsoft All-In-One Code Framework New Samples", Retrieved at <<http://www.7388.info/index.php/article/wpf/2011-05-31/16895.html>>, Oct. 10, 2010, pp. 5.

Suh, et al., "AEGIS: Architecture for Tamper-Evident and Tamper-Resistant Processing", Retrieved at <<http://csg.csail.mit.edu/pubs/memos/Memo-461/memo-461.pdf>>, Proceedings of the 17th annual international conference on Supercomputing, 2003, pp. 18.

"BitLocker Drive Encryption Overview", Retrieved at <<http://technet.microsoft.com/en-us/library/cc732774.aspx>>, Retrieved Date: Jul. 21, 2011, pp. 8.

"Whotspot", Retrieved at <<http://www.whotspot.com/hotnews.html>>, Retrieved Date: Jul. 22, 2011, pp. 5.

\* cited by examiner

900

REACTIVE ANTI-TAMPERING SYSTEM FOR PROTECTED SERVICES IN AN ENTERPRISE COMPUTING SYSTEM

BACKGROUND

An enterprise computing system may rely on crucial services to maintain the operational state and integrity of the system. The enterprise computing system may rely on a network management service to ensure that network connections between the computing systems in the enterprise are operational at all times. A security service may utilize anti-malware and/or anti-virus programs to guard against malware and computer virus attacks. At times, an unauthorized alteration, use, or removal of a crucial service may occur. For example, a software feature of a crucial service that control policies of access, usage and/or dissemination may be disabled, altered, or removed by a user causing data loss and/or destruction to the enterprise computing system. Alternatively, a user may inadvertently delete a crucial program from a service thereby subjecting the user's device to possible malware attacks. Accordingly, the integrity of an enterprise computing system depends on the execution of authorized programs performing authorized functions on valid data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An enterprise computing system may utilize crucial services to ensure the integrity of the system. At times, these crucial services may be intentionally or inadvertently disabled, removed, or altered thereby subjecting the system to anomalous events, such as malware attacks and the like. The enterprise computing system may utilize a reactive anti-tampering mechanism that monitors for occurrence of a tamper event on a crucial service and executes a remedial action to remedy the unintended action.

The enterprise computing system may utilize a management infrastructure that interacts with various services on client devices. The management infrastructure accepts requests through an anti-tamper procedure that specifies a tamper event, a crucial service that is to be protected, and a remedial action that may be applied when the tamper event occurs on the protected service. The anti-tamper procedure may be created by an enterprise system administrator and distributed to one or more client devices in the system. The management infrastructure monitors a protected service in accordance with the operations and actions specified in the anti-tamper procedure thereby ensuring that the integrity of the system is preserved.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to embodiments of a mechanism that monitors the unauthorized alteration, use, or removal of a protected service or program and reacts to restore the protected service or program to an intended state. The mechanism is reactive in that it does not prevent tampering of a protected service rather detects when an anomalous event occurs to the protected service and provides an appropriate remedial action thereafter. The mechanism may automatically restart the service when stopped, return the service to its original state when altered, as well as perform other remedial actions.

A service may be a process which is an instance of a program that resides on a client device and which provides a crucial function. For example, an anti-malware program may be installed on a client device and operate upon initiation from a user or automatically start at system boot. The user may also uninstall the program, disable certain features, or modify the program as desired. The program may take the form of a software application, component, thread, procedure, and the like. As used herein, the term "service" shall denote programs, processes and services that perform crucial functions which are designated as such by a system administrator or user.

A user with administrative privileges, permissions, and/or rights may turn off a protected service intentionally or unintentionally for any reason. For example, the user may turn off a protected service to gain better system performance to perform other tasks. A user may inadvertently uninstall a protected service without realizing that they have done so. A user may intentionally disable a protected service so that they may achieve better performance while debugging an application or to achieve faster performance to execute another application.

A service may be associated with properties or characteristics that define certain features of the service. A service may be associated with a service configuration that may define settings for the features of the service. For example, the security properties of a service may specify the security requirements of a service, such as what security measures to apply and the credentials required to access the service, and so on. A service may also contain applications and files used to operate the service and to perform the functions of the service.

Figure 1:
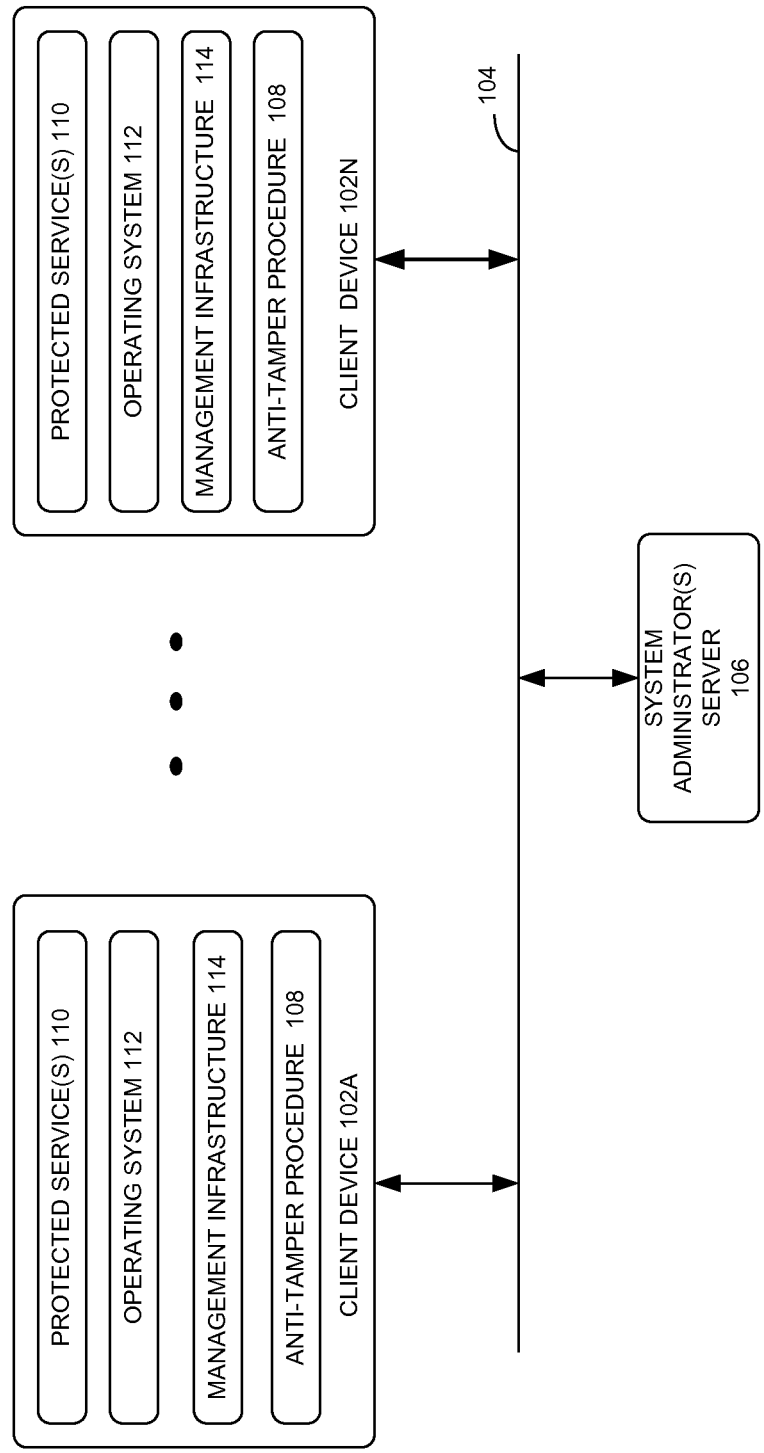
FIG. 1 illustrates a block diagram of a first exemplary system for a reactive anti-tampering device.

Attention now turns to a description of an exemplary reactive anti-tampering system. Referring to FIG. 1, there is shown an exemplary reactive anti-tampering system 100. The system 100 may be an enterprise computing system having several client devices 102A-102N (collectively, '102') and a system administrator server 106 communicatively connected through an interconnect 104. A client device 102 may be any type of electronic device capable of executing programmable instructions such as, without limitation, a mobile device, a personal digital assistant, a mobile client device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, a router, a gateway, or combination thereof.

The interconnect 104 may be any type of communications link capable of facilitating communications between the client devices 102 and the system administrator server 106, utilizing any type of communications protocol and in any configuration, such as without limitation, a wired network, wireless network, or combination thereof. The interconnect may be a local area network (LAN), wide area network (WAN), intranet or the Internet operating in accordance with an appropriate communications protocol.

A system administrator may be one or more persons responsible for maintaining and supporting the enterprise computing system 100. The system administrator may employ a server 106 that is communicatively coupled to the client devices 102 via the interconnect 104. The server 106 may host some of the services that are utilized by some or all of the client devices 102. The system administrator may create or receive an anti-tamper procedure 108 that the system administrator may distribute to some or all of the client devices 102. The anti-tamper procedure 108 identifies the events that are to be monitored, the protected services where the events may occur, and the remedial action that should be employed when an event occurs at a particular protected service.

Each client device 102 may include a protected service 110, an operating system 112, a management infrastructure 114, and an anti-tamper procedure 108. The protected service 110 may be embodied as a program and the operating system 112 manages the resources provided by the client device 102.

The management infrastructure 114 provides an object-oriented programming interface to obtain management data from components in the enterprise computing system. The management infrastructure 114 may be configured to support providers, consumers, and managed objects. A managed object is any logical or physical component of the enterprise computing system that may be monitored such as, without limitation, a hardware device, a process, a service, a program, an operating system, a network connection, and so forth. A managed object is associated with a provider that communicates with the managed object in a protocol associated with the service. A provider may be represented as an object model having a set of methods and data that may be accessed from an external program.

For example, the management infrastructure may be associated with an event log provider that provides access to an event log service. The event log service may be the managed object and the event log provider handles the communication of messages between the management infrastructure and the event log service. The event log provider is associated with classes that are used in the anti-tamper procedure to invoke objects that are used to perform actions within the event log service.

A consumer is the recipient of the managed data and the consumer requests the managed data through an object model associated with the management infrastructure. In one or more embodiments, the consumer may be a system administrator that interacts with the management infrastructure through a program, such as the anti-tamper procedure. The anti-tamper procedure may be implemented in the form of a script, a program, or any type of executable instructions. The anti-tamper procedure may contain commands written in the management infrastructure's object oriented programming interface that instruct the management infrastructure to monitor specific events and to execute a corresponding remedial action. The management infrastructure binds an instance of each event class in the anti-tamper procedure to create a flow of operations that result in execution of a remedial action upon the occurrence of the event. In one or more embodiments, the management infrastructure engine may be Microsoft's Windows Management Instrumentation (WMI). However, the embodiments are not constrained to WMI and any other management infrastructure technology may be utilized.

Figure 2:
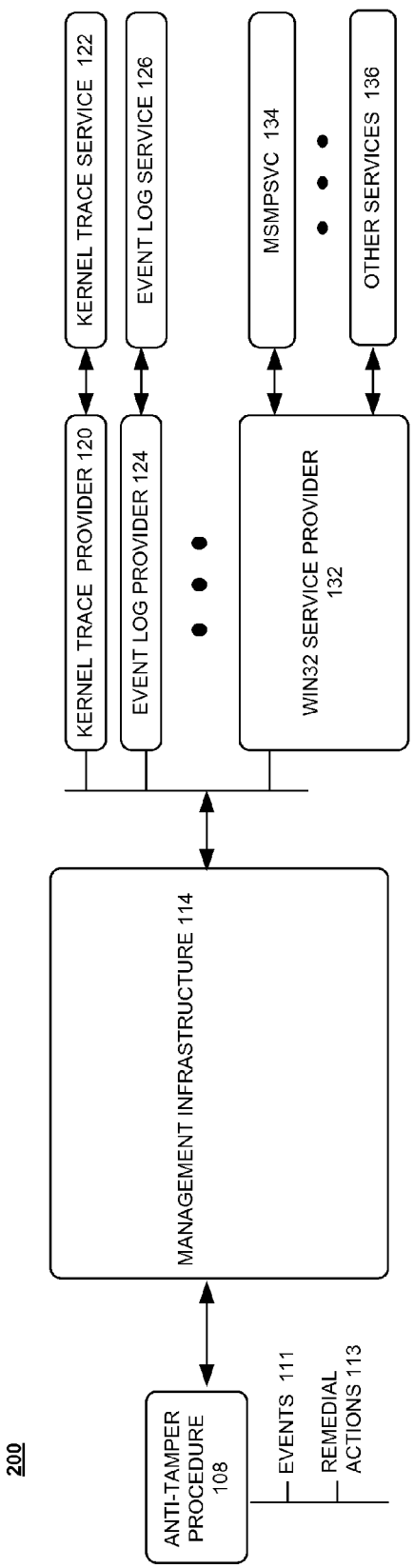
FIG. 2 illustrates a block diagram of a second exemplary system for a reactive anti-tampering device.

Attention now turns to a more detailed description of the components of the reactive anti-tampering system. Referring to FIG. 2, the management infrastructure 114 receives requests for management data from a consumer as events 111 specified in the anti-tamper procedure 108. The management infrastructure 114 evaluates the request and identifies which provider has the information. The management infrastructure 114 retrieves the management data from a provider and executes the remedial action 113 specified in the anti-tamper procedure 108. Typically, the remedial action 113 may involve executing a sequence of instructions that are applied to a protected service 110.

The management infrastructure 114 interacts with several providers and each provider communicates with a corresponding managed object which may be a service or system. As shown in FIG. 2, the management infrastructure 114 interacts with a kernel trace provider 120, an event log provider 124, and a win32 service provider 132. The kernel trace provider 120 provides kernel trace events when a process or thread is created or terminated. The kernel trace provider 120 communicates with a kernel trace service 122 that traces the call stacks of the kernel when a specified event occurs. The event log provider 124 communicates with an event log service to write data into log files and to obtain notifications of events.

The win32 service provider 132 provides data pertaining to an identified operating system level hardware or software component in the system by communicating with various services. For example, the win32 service provider 132 may manage the Microsoft Malware Protection Service ("MSMPSVC") which provides anti-malware, anti-spam, anti-virus and other security services in the enterprise system. The win32 service provider 132 may also manage other services 136.

Although the systems shown in FIGS. 1 and 2 have a limited number of elements in a certain configuration, it should be appreciated that these systems can include more or less elements in alternate configurations for an intended implementation. In addition, the systems shown in FIGS. 1 and 2 may comprise a computer-implemented system having multiple components, programs, procedures, modules. As used herein these terms are intended to refer to a computer-related entity, comprising either hardware, a combination of hardware and software, or software. For example, an element shown in FIGS. 1 and 2 may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Attention now turns to a more detailed discussion of operations of the embodiments with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
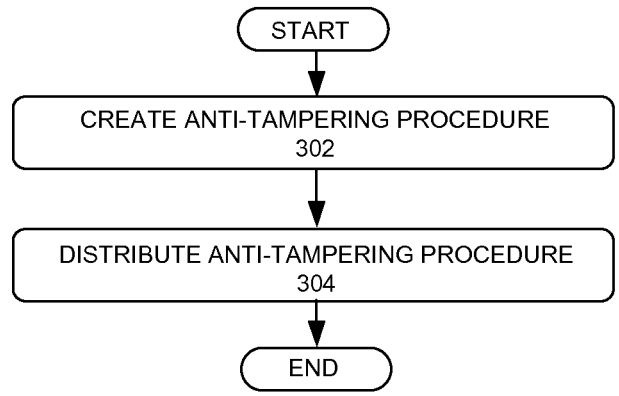
FIG. 3 illustrates a first exemplary method.

Referring to FIG. 3, a system administrator may create an anti-tampering procedure 108 that describes the protected service that may be monitored by the management infrastructure 114. The anti-tampering procedure 108 may be created on the system administrator server 106 (block 302) and distributed to one or more client devices 102 within an enterprise system (block 304). Alternatively, the system administrator may create the anti-tampering procedure 108 in one or more client devices 102.

Figure 4:
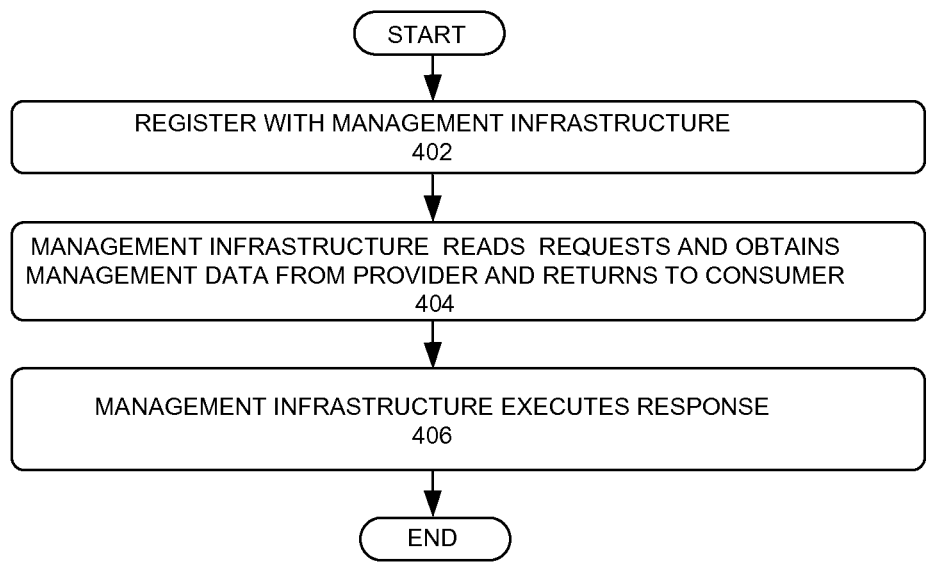
FIG. 4 illustrates a second exemplary method.

Referring to FIG. 4, upon activation of the anti-tamper procedure 108, the anti-tamper procedure 108 registers with the management infrastructure 114 (block 402). The management infrastructure 114 reads the requests in the anti-tamper procedure 108 and obtains the management data from the corresponding provider which is returned to the anti-tamper procedure 108 (block 404). Upon the occurrence of the event specified in the anti-tamper procedure 108, the management infrastructure 114 initiates the remedial action specified in the anti-tamper procedure 108 (block 406).

Figure 5:
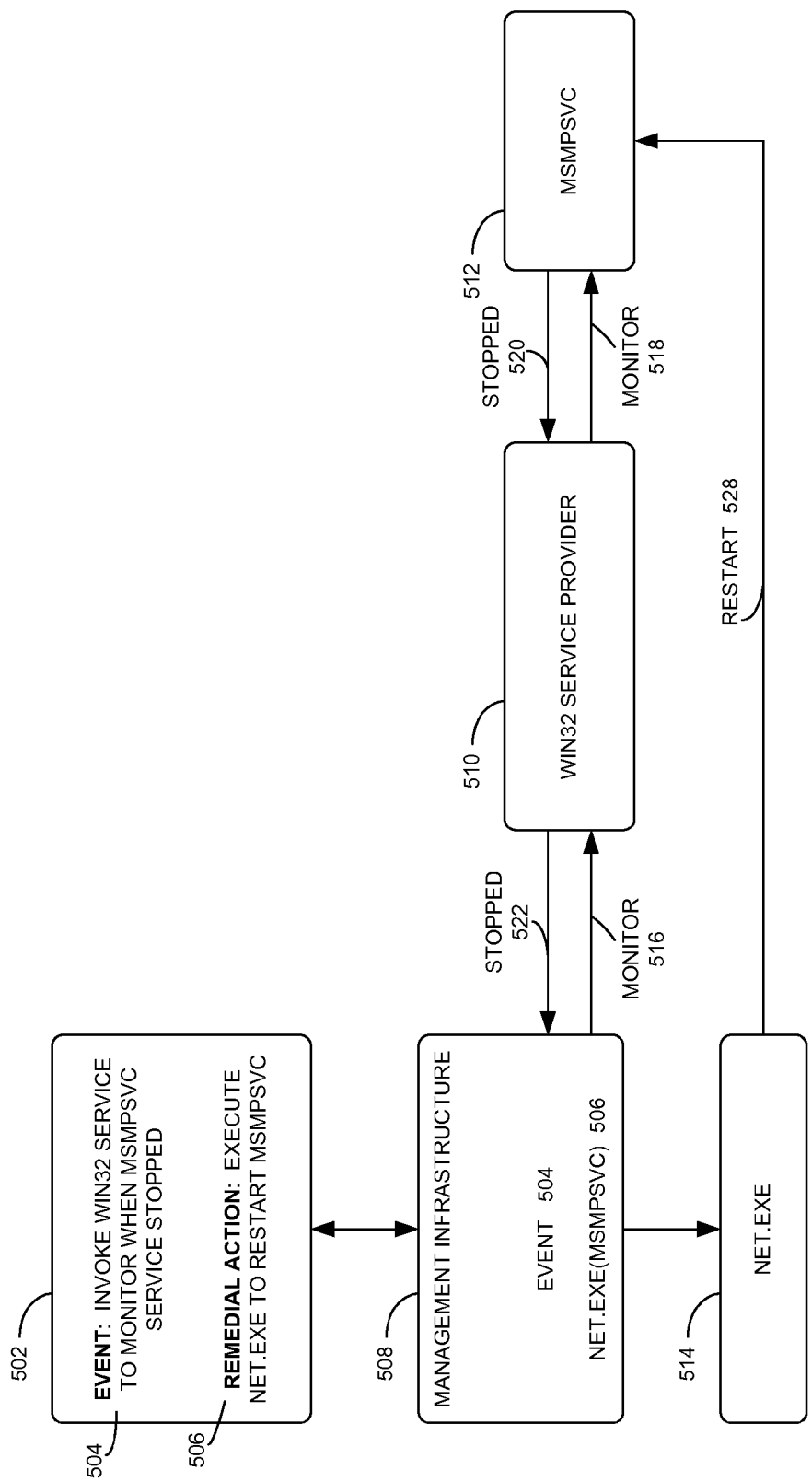
FIG. 5 illustrates an exemplary application of the reactive anti-tampering process in restarting a service after the service was stopped.

FIG. 5 is an example illustrating how the anti-tamper procedure may be used to restart a protected service after a user may have stopped the service. In FIG. 5, the Microsoft Malware Protection Service (MSMPSVC) is restarted after it has been stopped. An anti-tamper procedure 502 may be created that specifies an event 504 and a remedial action 506. The event 504 may specify that the management infrastructure should utilize the win32 service provider 510 to monitor when the MSMPSVC service 512 stops and the remedial action 506 may specify execution of a net.exe procedure to restart the MSMPSVC service 512 (block 502).

The management infrastructure 508 receives the anti-tamper procedure 502, creates an event which is linked to the remedial action, and invokes the win32 service provider 510 to monitor the MSMPSVC service 512. The management infrastructure 508 may transmit a monitor notification 516 to the win32 service provider 510 which in turn transmits another monitor notification 518 to the MSMPSVC service 512. A notification 520 is transmitted to the win32 service provider 510 when the MSMPSVC service 512 has stopped. The win32 service provider 510 transmits a stopped notification 522 to the management infrastructure 508. Upon notification that the MSMPSVC service 512 has stopped, the management infrastructure 508 invokes the remedial action 506 which executes the net.exe procedure which, in turn, transmits a notification 528 to restart the MSMPSVC service 512 (block 514).

Figure 6:
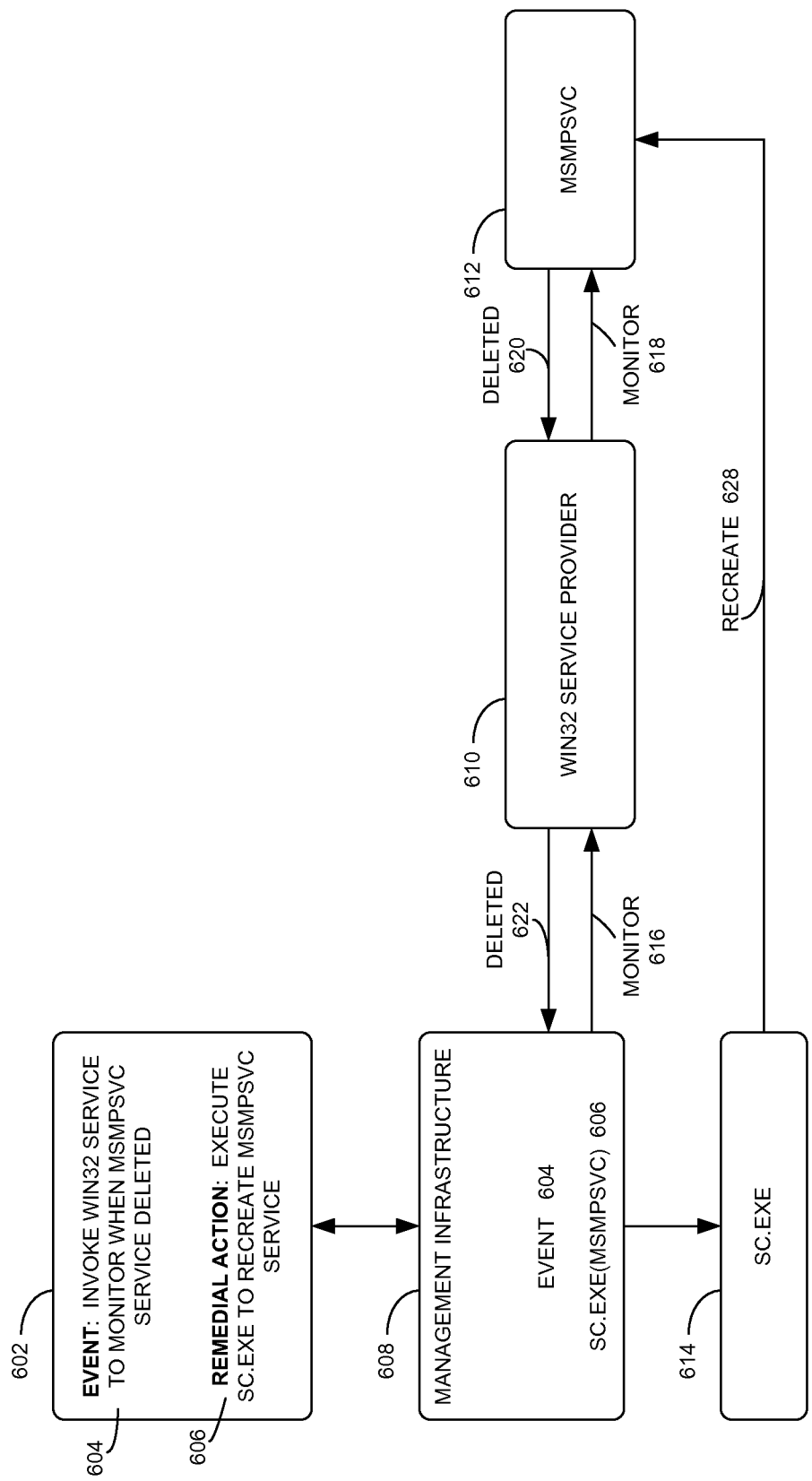
FIG. 6 illustrates an exemplary application of the reactive anti-tampering process in recreating or installing a service after the service was deleted or uninstalled.

FIG. 6 is an example illustrating how the anti-tamper procedure may be used to recreate or install the MSMPSVC service 612 after it has been deleted or uninstalled. An anti-tamper procedure 602 may be created that specifies an event 604 and a remedial action 606. The event 604 may specify that the management infrastructure 608 should utilize the win32 service provider 610 to determine when the MSMPSVC service 612 has been deleted or uninstalled and the remedial action 606 may specify execution of a sc.exe procedure to create or install the MSMPSVC service 612 (block 602).

The management infrastructure 608 receives the anti-tamper procedure 602, creates an event which is linked to the remedial action, and invokes the win32 service provider 610 to monitor the MSMPSVC service 612. The management infrastructure 608 may transmit a monitor notification 616 to the win32 service provider 610 which in turn transmits another monitor notification 618 to the MSMPSVC service 612. A deleted notification 620 is transmitted to the win32 service provider 610 when the MSMPSVC service 612 has been deleted or uninstalled. The win32 service provider 610 transmits a deleted notification 622 to the management infrastructure 608. Upon notification that the MSMPSVC service 612 was deleted or uninstalled, the management infrastructure 608 invokes the remedial action 606 which executes the sc.exe procedure which transmits a notification 628 to recreate or install the MSMPSVC service 612 (block 614).

Figure 7:
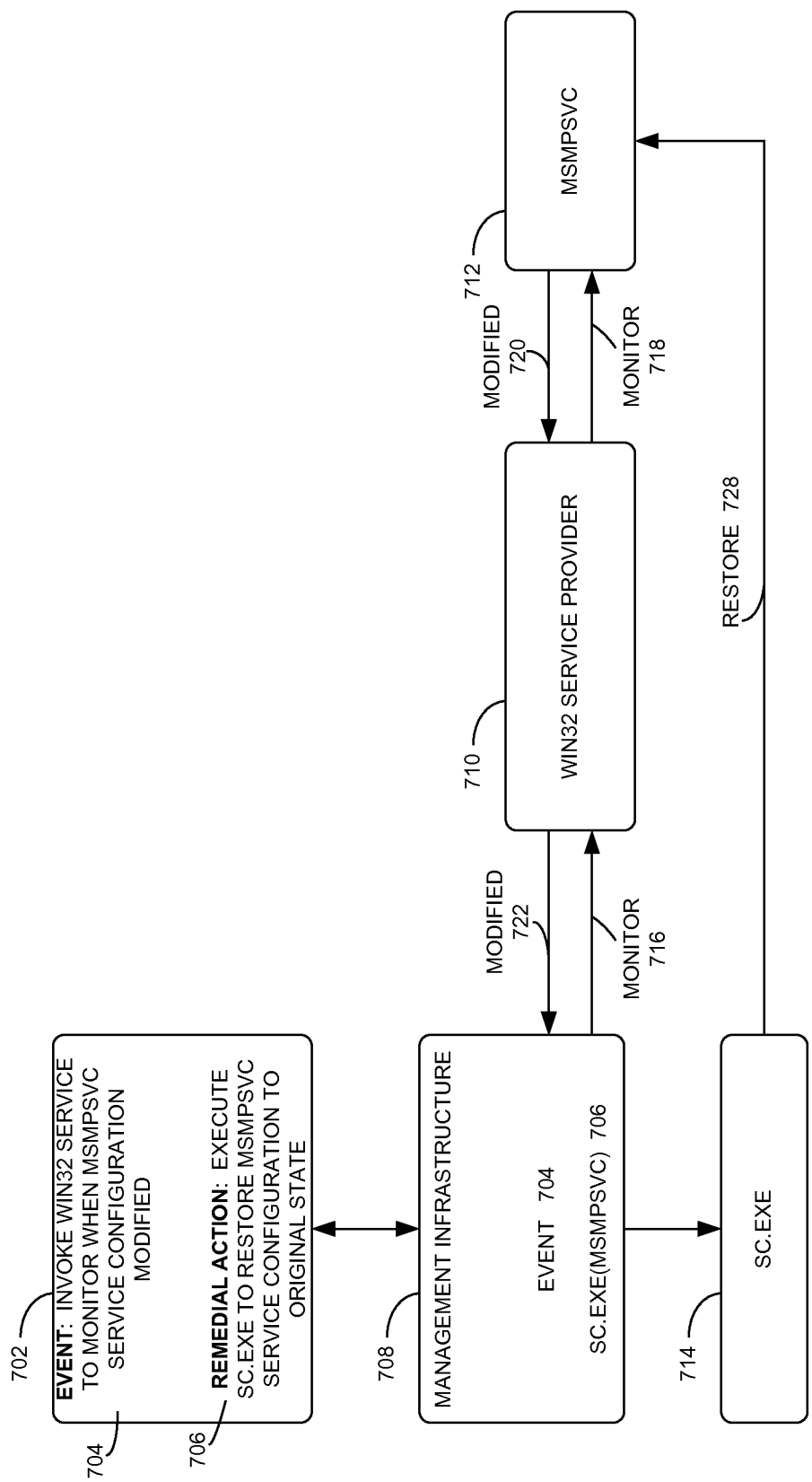
FIG. 7 illustrates an exemplary application of the reactive anti-tampering process in restoring a service configuration to an original state after the service configuration was modified.

FIG. 7 is an example illustrating how the anti-tamper procedure may be used to monitor when the MSMPSVC service configuration has been modified. An anti-tamper procedure 702 may be created that specifies an event 704 and a remedial action 706. The event 704 may specify that the management infrastructure 708 should utilize the win32 service provider 710 to determine when the MSMPSVC service configuration has been modified and the remedial action 706 may specify execution of a sc.exe procedure to restore the MSMPSVC service configuration to its original configuration (block 702).

The management infrastructure 708 receives the anti-tamper procedure 702, creates an event which is linked to the remedial action, and invokes the win32 service provider 710 to monitor the MSMPSVC service 712. The management infrastructure 708 may transmit a monitor notification 716 to the win32 service provider 710 which in turn transmits another monitor notification 718 to the MSMPSVC service 712. A modified notification 720 is transmitted to the win32 service provider 710 when the MSMPSVC service configuration has been modified. The win32 service provider 710 transmits a modified notification 722 to the management infrastructure 708. Upon notification that the MSMPSVC service configuration has been modified, the management infrastructure 708 invokes the remedial action 706 which executes the sc.exe procedure which transmits a notification 728 to restore the MSMPSVC service configuration to the original configuration (block 714).

Figure 8:
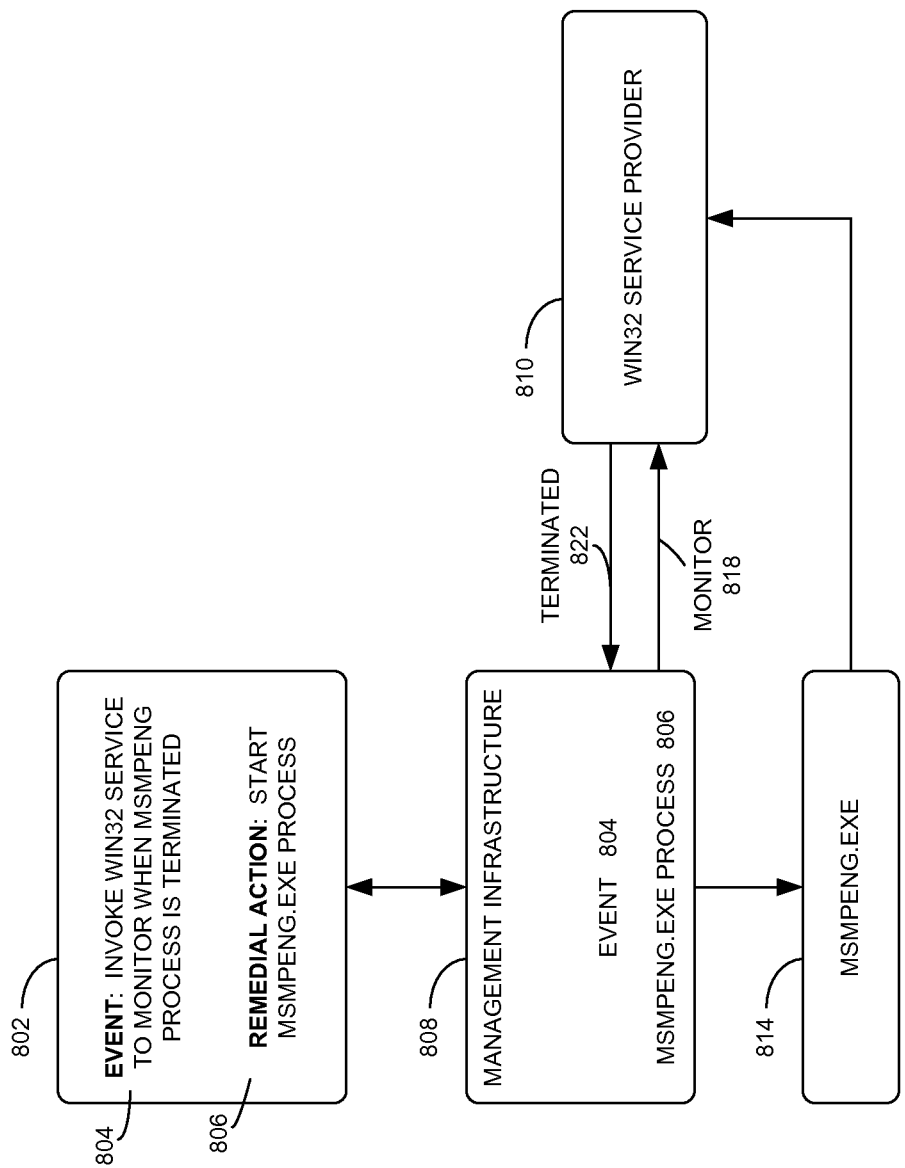
FIG. 8 illustrates an exemplary application of the reactive anti-tampering process in restarting a process after the process had been terminated.

FIG. 8 is an example illustrating how the anti-tamper procedure may be used to monitor when the MSMPENG process within the win32 service provider has been terminated. An anti-tamper procedure 802 may be created that specifies an event 804 and a remedial action 806. The event 804 may specify that the management infrastructure 808 should monitor the win32 service provider 810 to determine when the MSMPENG process has been terminated and the remedial action 806 may specify execution of the msmpeng.exe procedure in the wen32 service provider 810 (block 802).

The management infrastructure 808 receives the anti-tamper procedure 802, creates an event which is linked to the remedial action, and sends a monitor notification 818 to the win32 service provider 810. A terminated notification 822 is transmitted to the management infrastructure 808 when the MSMPENG process has been terminated. The management infrastructure 808 invokes the remedial action 806 which initiates execution of msmpeng.exe in the win32 service provider 810 thereby restarting the process (block 814).

Figure 9:
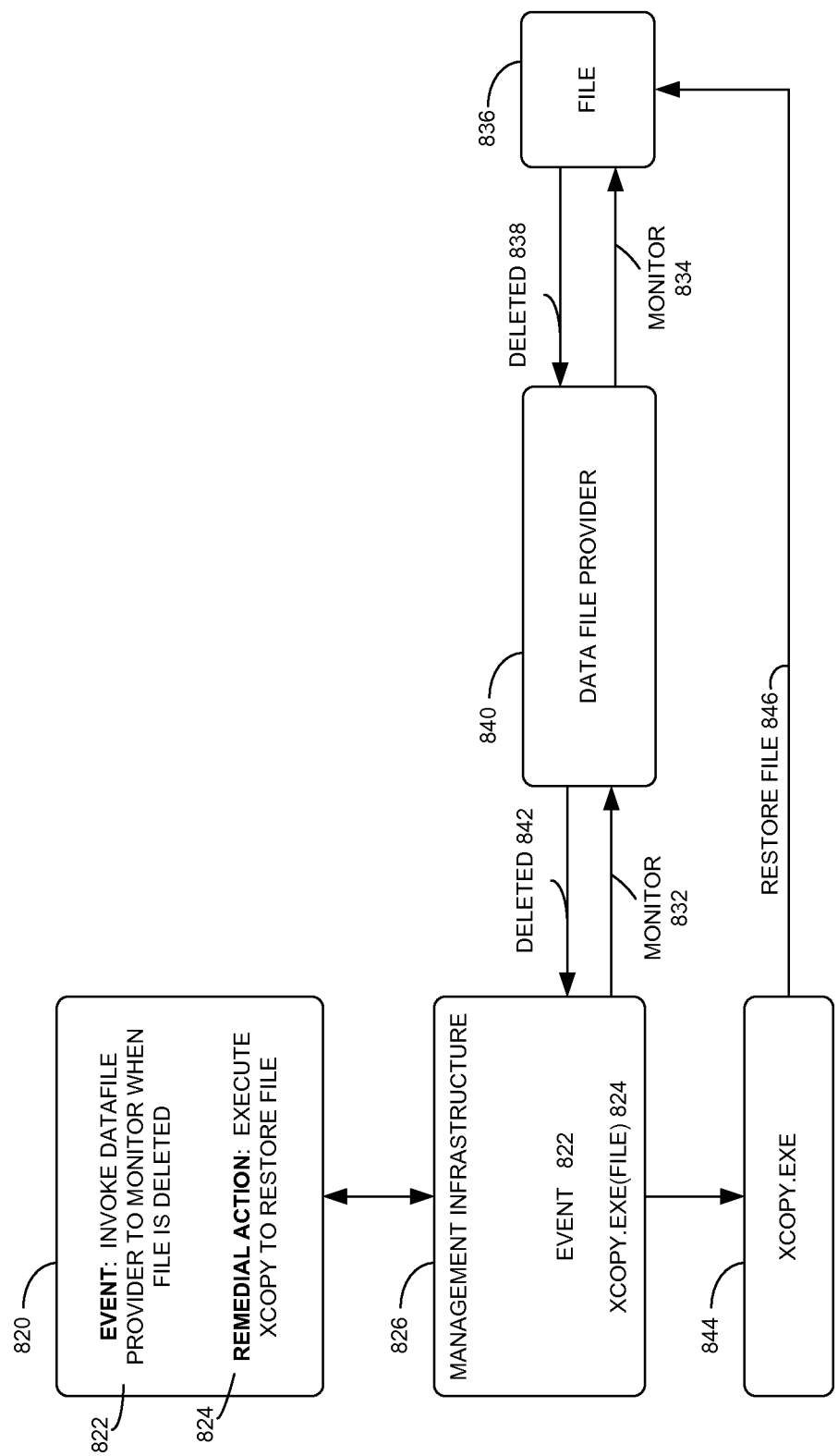
FIG. 9 illustrates an exemplary application of the reactive anti-tampering process in restoring a file after the file was deleted.

FIG. 9 is an example illustrating how the anti-tamper procedure may be used to restore a file or executable when deleted by a user. An anti-tamper procedure 820 may be created that specifies an event 822 and a remedial action 824. The event 822 may specify that the management infrastructure 826 should monitor a data file provider 840 to determine when the file has been deleted and the remedial action 824 may specify execution of the xcopy.exe procedure to restore the file (block 820).

The management infrastructure 826 receives the anti-tamper procedure 820, creates an event which is linked to the remedial action, and sends a monitor notification 832 to the data file provider 840. The data file provider 840 transmits a monitor notification 834 to the client device hosting the file 836. When the file is deleted, a deleted notification 838 is transmitted to the data file provider 840, which in turn, transmits a deleted notification 842 to the management infrastructure 826. The management infrastructure 826 invokes the remedial action 824 which initiates execution of xcopy.exe thereby restoring the file 846 (block 844).

Figure 10:
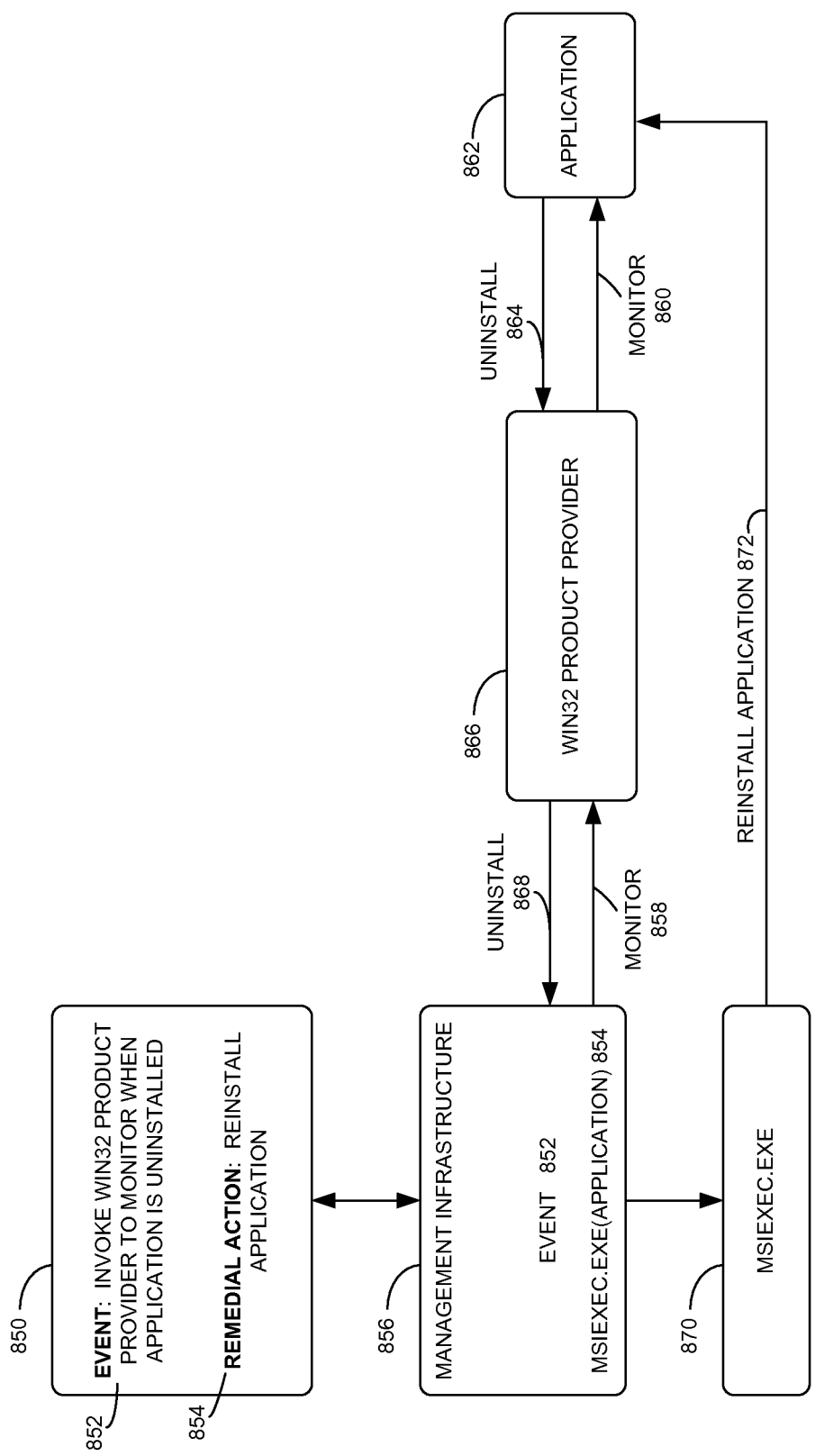
FIG. 10 illustrates an exemplary application of the reactive anti-tampering process in reinstalling an application after the application was uninstalled.

FIG. 10 is an example illustrating how the anti-tamper procedure may be used to reinstall an application after the application may have been uninstalled by a user. An anti-tamper procedure 850 may be created that specifies an event 852 and a remedial action 854. The event 852 may specify that the management infrastructure 856 should monitor when an application 862 is uninstalled and the remedial action 852 may specify execution of the msiexec.exe procedure to reinstall the application (block 850).

The management infrastructure 854 receives the anti-tamper procedure 850, creates an event which is linked to the remedial action, and sends a monitor notification 858 to a win32 product provider 866 which in turn may send another monitor notification 860 to the operating system of the client device 102 where the application resides. An uninstall notification 864 may be transmitted to the win32 product provider 866, which in turn, transmits another uninstall notification 868 to the management infrastructure 856. The management infrastructure 856 invokes the remedial action 852 which initiates execution of msiexec.exe thereby reinstalling the application 872 (block 870).

Figure 11:
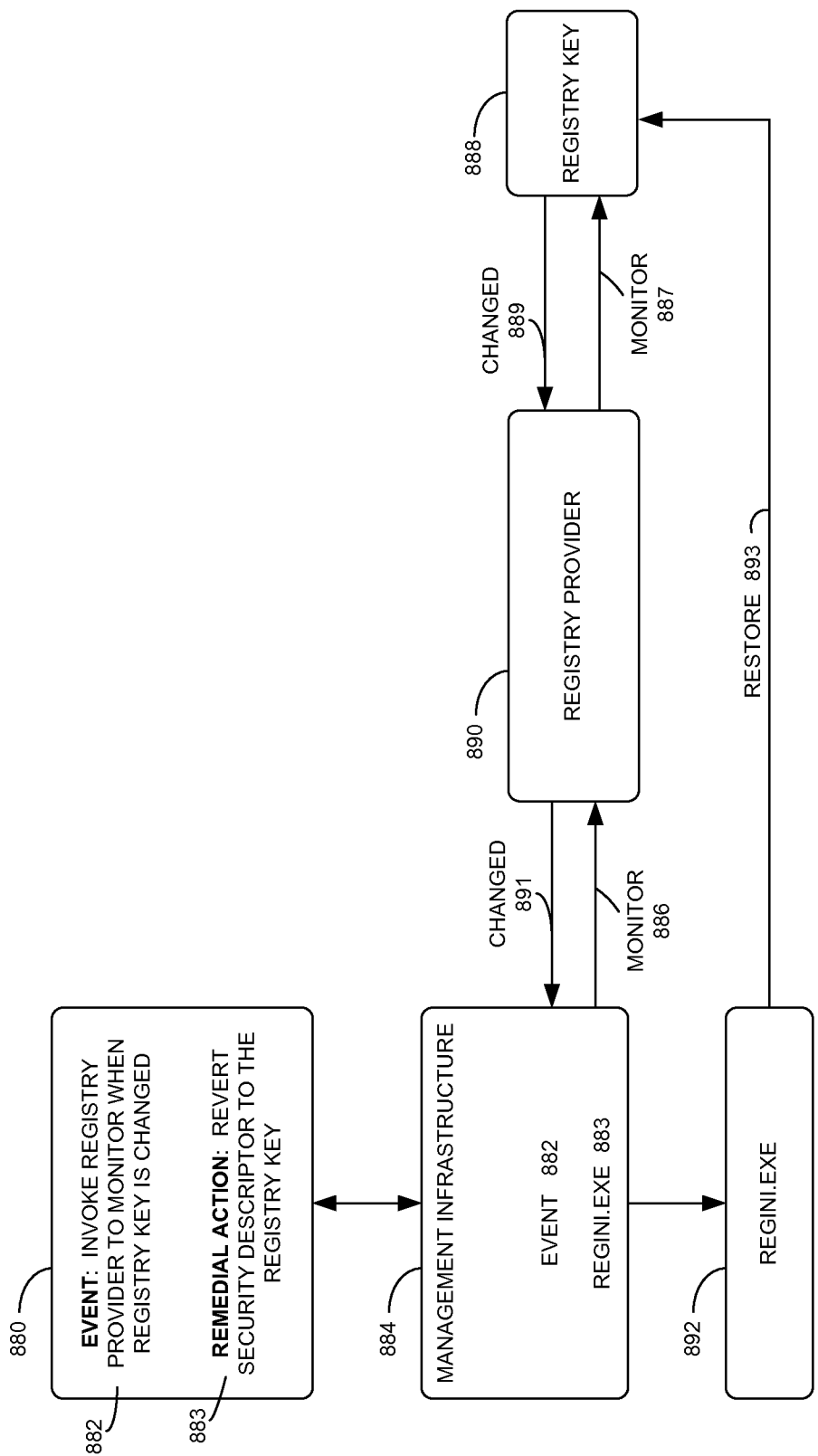
FIG. 11 illustrates an exemplary application of the reactive anti-tampering process in restoring a security property of a service to an original state after the security property was altered.

FIG. 11 is an example illustrating how the anti-tamper procedure may be used to restore the security properties of a service to an original state after the security properties may have been altered by a user. In the illustration shown in FIG. 11, the security property is a registry key of a service. A registry is a hierarchy of files that store settings used by an operating system. Configuration settings for a particular service are typically stored in a registry key. A security property is a configuration setting that is associated with a service. The security property may specify users who have certain access rights to the service.

Referring to FIG. 11, an anti-tamper procedure 880 may be created that specifies an event 882 and a remedial action 883. The event 882 may specify that the management infrastructure 884 should monitor when a registry key 888 has changed and the remedial action 883 may specify execution of the regini.exe procedure to restore a security descriptor of the registry key (block 880).

The management infrastructure 884 receives the anti-tamper procedure 880, creates an event which is linked to the remedial action, and sends a monitor notification 886 to a registry provider 890 which in turn may send another monitor notification 887 to the operating system where the registry key is located. A changed notification 889 may be transmitted to the registry provider 890, which in turn, transmits another changed notification 891 to the management infrastructure 884. The management infrastructure 884 invokes the remedial action 883 which initiates execution of regini.exe thereby restoring the original settings 893 (block 892).

The exemplary embodiments shown in FIGS. 5-11 are illustrative and it should be appreciated that the embodiments are not limited to these illustrations. Although the illustrations utilized examples using terminology and constructs from Microsoft's Windows® operating system, the embodiments are not limited to implementations on a Windows-based system.

Figure 12:
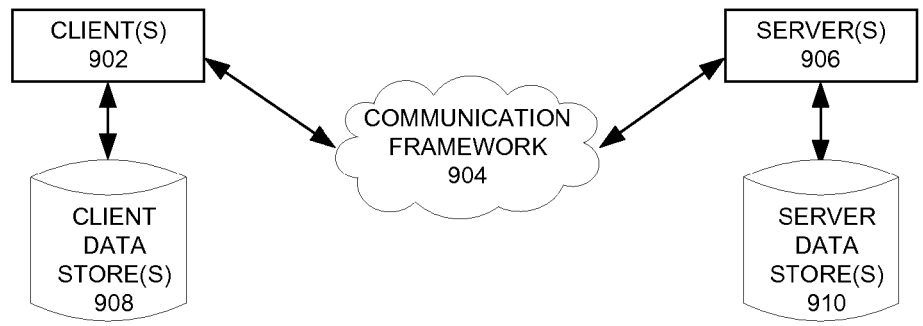
FIG. 12 is a block diagram illustrating an operating environment.

Attention now turns to a discussion of an exemplary operating environment. Referring now to FIG. 12, there is shown a schematic block diagram of an exemplary operating environment 900. It should be noted that the operating environment 900 is exemplary and is not intended to suggest any limitation as to the functionality of the embodiments. The embodiments may be applied to an operating environment 900 having one or more client(s) 902 in communication through a communications framework 904 with one or more server(s) 906. The operating environment 900 may be configured in a network environment or distributed environment having remote or local storage devices. Additionally, the operating environment 900 may be configured as a stand-alone client device having access to remote or local storage devices. Each client(s) 902 may be coupled to one or more client data store(s) 908 that store information local to the client 902. Each server(s) 906 may be coupled to one or more server data store(s) 910 that store information local to the server 906.

A client 902 may be embodied as a hardware device, a software module, or as a combination thereof. Examples of such hardware devices may include, but are not limited to, a computer (e.g., server, personal computer, laptop, etc.), a cell phone, a personal digital assistant, or any type of client device, and the like. A client 902 may also be embodied as a software module having instructions that execute in a single execution path, multiple concurrent execution paths (e.g., thread, process, etc.), or in any other manner.

A server 906 may be embodied as a hardware device, a software module, or as a combination thereof. Examples of such hardware devices may include, but are not limited to, a computer (e.g., server, personal computer, laptop, etc.), a cell phone, a personal digital assistant, or any type of client device, and the like. A server 906 may also be embodied as a software module having instructions that execute in a single execution path, multiple concurrent execution paths (e.g., thread, process, etc.), or in any other manner.

The communications framework 904 facilitates communications between the client 902 and the server 906. In an embodiment, the communications framework 904 may be embodied as a communications network, such as the Internet, a local area network, or a wide area network, or combinations thereof. The communications framework 904 may embody any type of communications medium, such as wired or wireless networks, utilizing any communication protocol.

Figure 13:
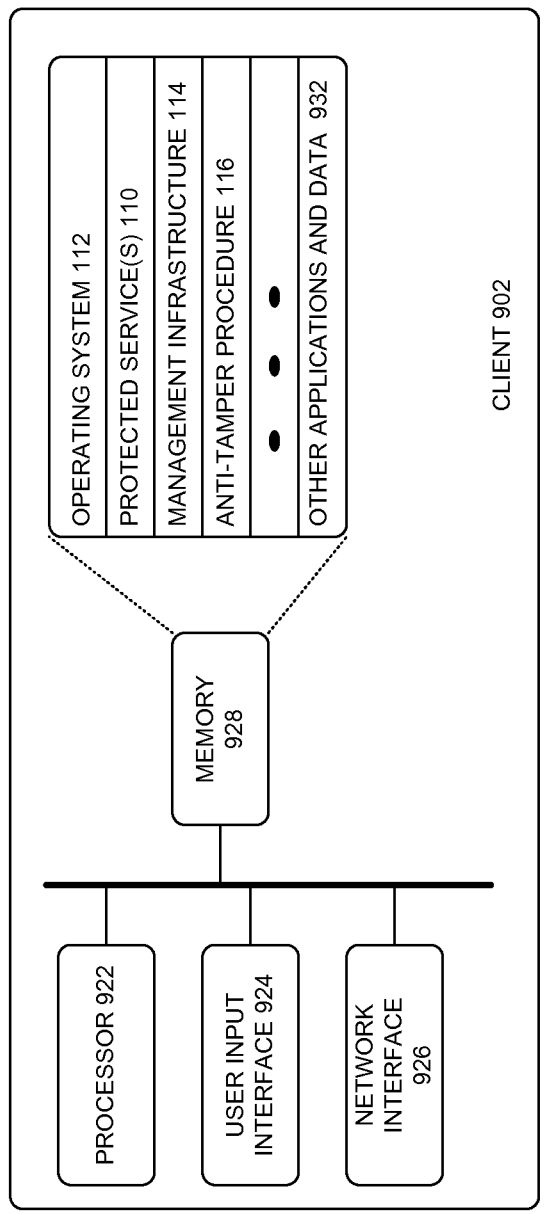
FIG. 13 is a block diagram illustrating exemplary components of a client device used in an operating environment.

Referring to FIG. 13, a client 902 may have a processor 922, a user input interface 924, a network interface 926, and a memory 928. The processor 922 may be any commercially available processor and may include dual microprocessors and multi-processor architectures. The user input interface 924 receives user input through one or more input devices, such as a keyboard, touch screen, display, mouse, joy stick, etc. The network interface 926 facilitates wired or wireless communications between the client 902 and a communications framework 904.

The memory 928 may be any computer-readable storage media or computer-readable media that may store processor-executable instructions, procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy drive, disk drive, flash memory, and the like. The memory 928 may also include one or more external storage devices or remotely located storage devices. The memory 928 may contain instructions and data as follows:

an operating system 112;
one or more protected services 110;
a management infrastructure 114;
an anti-tamper procedure 116; and
various other applications and data 932.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, various embodiments of the system may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software components, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A method implemented on a client device having at least one processor, comprising:
receiving a request to monitor for occurrence of a tamper event affecting a protected service executing on the client device, the protected service including an instance of a program that provides a function critical for operation of the client device, the request distributed by a system administrator, the request comprising a remedial action for remedying the tamper event and a provider that provides data from the protected service, the client device part of an enterprise computing system having multiple client devices;
utilizing a management infrastructure to monitor the protected service for an occurrence of a tamper event through data received from the provider and to initiate a remedial action in response to detecting occurrence of the tamper event, wherein the provider communicates directly with the protected service;
receiving data from the provider that indicates that the tamper event has occurred at the protected service; and
applying the remedial action to the protected service,
wherein the tamper event, the protected service and the remedial action are specified through executable instructions.

2. The method of claim 1, wherein the management infrastructure is Windows Management Instrumentation.

3. The method of claim 1, wherein the tamper event is a removal of a protected service and the remedial action is to install the protected service.

4. The method of claim 1, wherein the tamper event stops a protected service and the remedial action restarts the protected service.

5. The method of claim 1, wherein the tamper event changes a service configuration of a protected service and the remedial action restores the service configuration of the protected service to an original state.

6. The method of claim 1, wherein the tamper event deletes a file associated with a protected service and the remedial action restores the file.

7. The method of claim 1, wherein the tamper event uninstalled an application associated with a protected service and the remedial action installs the application.

8. The method of claim 1, wherein the tamper event alters security properties of a protected service and the remedial action restores the security properties to an original state.

9. The method of claim 1, wherein the tamper event and the remedial action are defined through a script file.

10. A computer-readable storage medium storing thereon processor-executable instructions, that when executed perform actions, the actions comprising:
- receiving a request to monitor a protected service, the protected service providing a critical function, the request distributed by a system administrator, the request comprising a remedial action for remedying an event and a provider that provides data from the protected service;
- utilizing a management infrastructure to monitor the protected service for an occurrence of an event through data received from the provider and to initiate a remedial action in response to detecting occurrence of the event, wherein the provider communicates directly with the protected service;
- receiving data from the provider that indicates that the event has occurred at the protected service; and
- applying the remedial action to the protected service,
- wherein the event, the protected service and the remedial action are specified through executable instructions.

11. A computer-readable storage medium of claim 10, wherein the event affects execution of a protected service, wholly or in part, and the remedial action restores execution of the protected service.

12. A computer-readable storage medium of claim 10, wherein the event alters a service configuration of a protected service and the remedial action restores the service configuration to an original state.

13. A computer-readable storage medium of claim 10, wherein the event affects a process associated with a protected service and the remedial action reactivates the process.

14. A computer-readable storage medium of claim 10, wherein the event changes security properties associated with a protected service and the remedial action restores the security properties to an original state.

15. A computer-readable storage medium of claim 10, wherein the event uninstalls an application associated with a protected service and the remedial action installs the application.

16. A system, comprising:
- at least one processor and a memory;
- the memory including:
  - a management infrastructure, having a programming interface that interacts with a protected service, the protected service comprising an instance of a program that provides a function critical for operation of the client device;
  - a script file having a first set of executable instructions that requests the management infrastructure to monitor the protected service for occurrence of an event, a second set of executable instructions that specify a remedial action that the management infrastructure performs on a protected service, and a provider that obtains data from the protected service; and
  - a plurality of providers, each provider coupled to the management infrastructure and a protected service, the provider configured to receive instructions from the management infrastructure and to provide data in response to instructions,
  - wherein the management infrastructure monitors the protected service through data obtained from at least one select provider.

17. The system of claim 16, wherein the first set of executable instructions request the management infrastructure to monitor stoppage of the protected service and the second set of executable instructions restart the protected service.

18. The system of claim 16, wherein the first set of executable instructions request the management infrastructure to monitor for removal of the protected service and the second set of executable instructions install the protected service.

19. The system of claim 16, wherein the first set of executable instructions request the management infrastructure to monitor for alteration of a feature of the protected service and the second set of executable instructions restore the protected service to an original state.

* * * * *